United States Patent
Lambert et al.

(10) Patent No.: US 11,294,849 B1
(45) Date of Patent: Apr. 5, 2022

(54) SYSTEMS AND METHODS FOR IN-BAND PULSE-ADDRESSABLE MULTIPLEXER

(71) Applicant: Dell Products L.P., Round Rock, TX (US)

(72) Inventors: Timothy M. Lambert, Austin, TX (US); Michael J. Stumpf, Cedar Park, TX (US); Jeffrey L. Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/100,445

(22) Filed: Nov. 20, 2020

(51) Int. Cl.
*G06F 13/42* (2006.01)
*H04L 12/40* (2006.01)

(52) U.S. Cl.
CPC .... *G06F 13/4282* (2013.01); *H04L 12/40013* (2013.01); *H04L 12/40071* (2013.01)

(58) Field of Classification Search
CPC ...................................................... G06F 21/72
See application file for complete search history.

(56) References Cited

U.S. PATENT DOCUMENTS

| | | | | |
|---|---|---|---|---|
| 6,567,881 | B1* | 5/2003 | Mojaver | G06F 13/4031 710/110 |
| 2002/0167910 | A1* | 11/2002 | Gammenthaler, Jr. | H04Q 3/0025 370/252 |
| 2006/0277346 | A1* | 12/2006 | Doak | H04L 12/5692 710/305 |
| 2016/0180114 | A1* | 6/2016 | Sastry | H04L 9/0643 713/189 |

\* cited by examiner

*Primary Examiner* — Henry Tsai
*Assistant Examiner* — Juanito C Borromeo
(74) *Attorney, Agent, or Firm* — Jackson Walker L.L.P.

(57) ABSTRACT

An information handling system may include a bus initiator, a plurality of bus endpoints, and a bus communicatively coupled between the bus initiator and the plurality of bus endpoints, wherein the bus comprises a multiplexer topology of a plurality of multiplexers. The bus initiator may be configured to perform in-band addressing to select a communications channel through the multiplexer topology via an addressing protocol that uses pulse bursts for initiation of the addressing, identification of the communications channel, and termination of the addressing. Pulses of the pulse bursts may be sufficiently short in duration to pass through filters of the bus endpoints such that the pulse bursts are not processed by the endpoints.

16 Claims, 5 Drawing Sheets

SYSTEMS AND METHODS FOR IN-BAND PULSE-ADDRESSABLE MULTIPLEXER

TECHNICAL FIELD

The present disclosure relates in general to information handling systems, and more particularly to methods and systems for implementing an in-band pulse addressable multiplexer in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more communications buses, including without limitation one or more Inter-Integrated Circuit (I2C) buses. To route communication to a desired target device on a communications bus, a communication must often be communicated through a number of multiplexers to reach the target device. For example, in some enterprise computing systems, a configuration may require four to seven I2C multiplexers to reach 50 or so bus subsegments. Using traditional multiplexers for switching such bus communication may require numerous pins for selecting multiplexer paths, thus leading to high cost, minimized density, and minimized communication bandwidth.

SUMMARY

In accordance with the teachings of the present disclosure, the disadvantages and problems associated with existing approaches to bus communication may be reduced or eliminated.

In accordance with embodiments of the present disclosure, an information handling system may include a bus initiator, a plurality of bus endpoints, and a bus communicatively coupled between the bus initiator and the plurality of bus endpoints, wherein the bus comprises a multiplexer topology of a plurality of multiplexers. The bus initiator may be configured to perform in-band addressing to select a communications channel through the multiplexer topology via an addressing protocol that uses pulse bursts for initiation of the addressing, identification of the communications channel, and termination of the addressing. Pulses of the pulse bursts may be sufficiently short in duration to pass through filters of the bus endpoints such that the pulse bursts are not processed by the endpoints.

In accordance with these and other embodiments of the present disclosure, a method may include, in an information handling system comprising a bus initiator, a plurality of bus endpoints, and a bus communicatively coupled between the bus initiator and the plurality of bus endpoints, wherein the bus comprises a multiplexer topology of a plurality of multiplexers: performing, by the bus initiator, in-band addressing to select a communications channel through the multiplexer topology via an addressing protocol that uses pulse bursts for initiation of the addressing, identification of the communications channel, and termination of the addressing. Pulses of the pulse bursts may be sufficiently short in duration to pass through filters of the bus endpoints such that the pulse bursts are not processed by the endpoints.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 6 wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
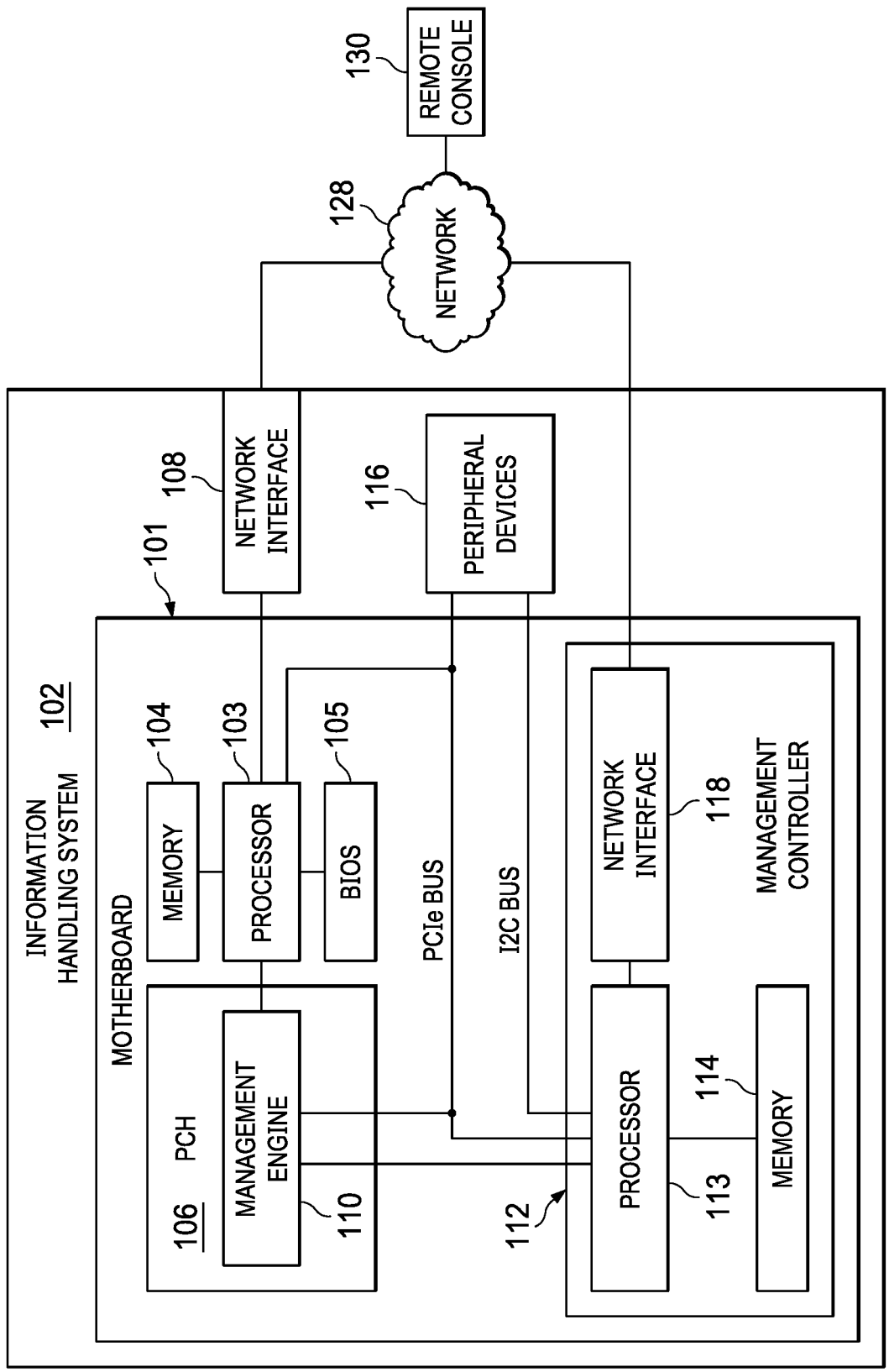
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a motherboard 101, a network interface 108 communicatively coupled to a processor 103 of motherboard 101, and one or more peripheral devices 116 communicatively coupled to processor 103.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include processor 103, a memory 104 communicatively coupled to processor 103, a platform controller hub (PCH) 106 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. Although memory 104 is depicted in FIG. 1 as integral to motherboard 101, in some embodiments, all or a portion of memory 104 may reside external to motherboard 101.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be stored on a read-only memory of information handling system 102 and which may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

PCH 106 may be any system, device, or apparatus configured to control certain data paths (e.g., data flow between processor 103, memory 104, and peripherals) and support certain functions of processor 103. A PCH 106 may also be known as a "chipset" of an information handling system 102. One such function may include management engine 110. Management engine 110 may comprise hardware and/or firmware that enables remote out-of-band management for information handling system 102 in order to monitor, maintain, update, upgrade, and/or repair information handling system 102. In some embodiments, management engine 110 may include hardware and firmware compliant with Intel's Active Management Technology. In these and other embodiments, firmware components of management engine 110 may be stored as a part of BIOS 105 on a read-only memory of information handling system 102.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118 separate from and physically isolated from in-band network interface 108. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112.

Network interface 118 may comprise any suitable system, apparatus, or device operable to serve as an interface between management controller 112, network 128, and/or one or more other information handling systems. Network interface 118 may enable management controller 112 to communicate using any suitable transmission protocol and/or standard. In these and other embodiments, network interface 118 may comprise a network interface card, or "NIC."

Network interface 108 may comprise any suitable system, apparatus, or device operable to serve as an interface between information handling system 102, network 128, and/or and one or more other information handling systems. Network interface 108 may enable information handling system 102 to communicate using any suitable transmission protocol and/or standard. In these and other embodiments, network interface 108 may comprise a network interface card, or "NIC."

Each peripheral device 116 may be communicatively coupled to processor 103 and may generally include any information handling resource. As shown in FIG. 1, peripheral devices 116 may also be coupled to processor 113 via an inter-integrated circuit (I2C) bus and/or via a PCIe bus. Processor 113 can communicate directly to peripheral devices via PCIe except for some messages that require a PCIe root complex. For these messages, management engine 110 may serve as a proxy between processor 113 and peripheral devices 116. Furthermore, in these and other embodiments, processor 113 may comprise an I2C initiator to facilitate I2C communication between processor 113 and peripheral devices 116.

Network 128 may be a network and/or fabric configured to couple information handling system 102, remote console 130, and/or one or more other information handling systems to one another. In these and other embodiments, network 128 may include a communication infrastructure, which provides physical connections, and a management layer, which organizes the physical connections and information handling systems communicatively coupled to network 128. Network 128 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 128 may transmit data via wireless transmissions and/or wireline transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 128 and its various components may be implemented using hardware, software, or any combination thereof.

Remote console 130 may comprise any information handling system including requisite hardware, software, and/or firmware for interfacing with management controller 112 via network interface 118 in order to facilitate remote management of information handling system 102 by remote console 130. In some embodiments, such remote management may be in accordance with Intelligent Platform Management Interface (IPMI) and/or another suitable interface or standard.

Figure 2:
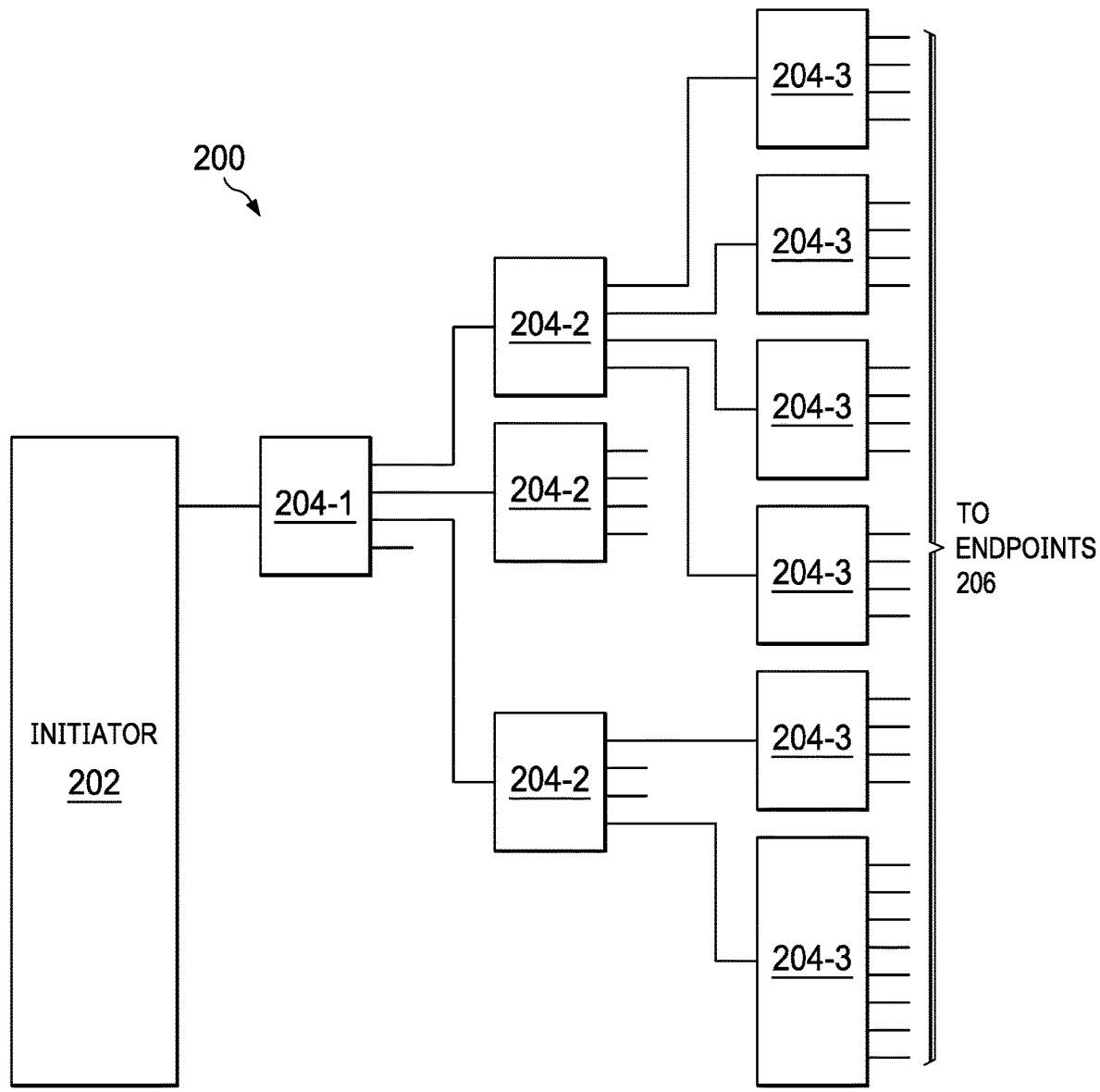
FIG. 2 illustrates a block diagram of an example I2C multiplexer topology, in accordance with embodiments of the present disclosure.

Although not shown in FIG. 1, the I2C bus between processor 113 and peripheral devices 116 may include a topology of multiplexers for selecting a path between processor 113 and an endpoint peripheral device 116. FIG. 2 illustrates a block diagram of an example I2C multiplexer topology 200, in accordance with embodiments of the present disclosure. As shown in FIG. 2, multiplexer topology 200 may include an initiator 202 (e.g., processor 113 of management controller 112), a plurality of multiplexers 204 interfaced between initiator 202 and a plurality of endpoints 206 (e.g., peripheral devices 116). As shown in FIG. 2, multiplexers 204 may be organized into one or more levels (e.g., a first level comprising multiplexer 204-1, a second level comprising multiplexers 204-2, and a third level comprising multiplexers 204-3). Although FIG. 2 depicts a particular number of multiplexers 204 in a topology of a particular number of levels, it is understood and within the scope of this disclosure for multiplexer topology 200 to include any suitable number of multiplexers 202 arranged in any suitable number of levels.

As described in greater detail below, initiator 202 may be configured to generate in-band pulsed commands on the I2C bus (e.g., pulses on a data line for the I2C bus) as opposed to addressing on out-of-band multiplexer select lines, in order to provide in-band addressing of multiplexers 204 and the ultimate endpoint 206 for a particular I2C communication. Such pulsed commands may issue from initiator 202 and traverse the I2C data bus in a manner that:
  May not be recognizable as a valid START condition for data communication;
  May be short enough in pulse width so as to not pass through glitch filters of an endpoint device such that the pulses are not seen by the endpoint device;

May not violate any I2C protocol or bus rules; and

May not significantly affect protocol efficiency.

Figure 3:
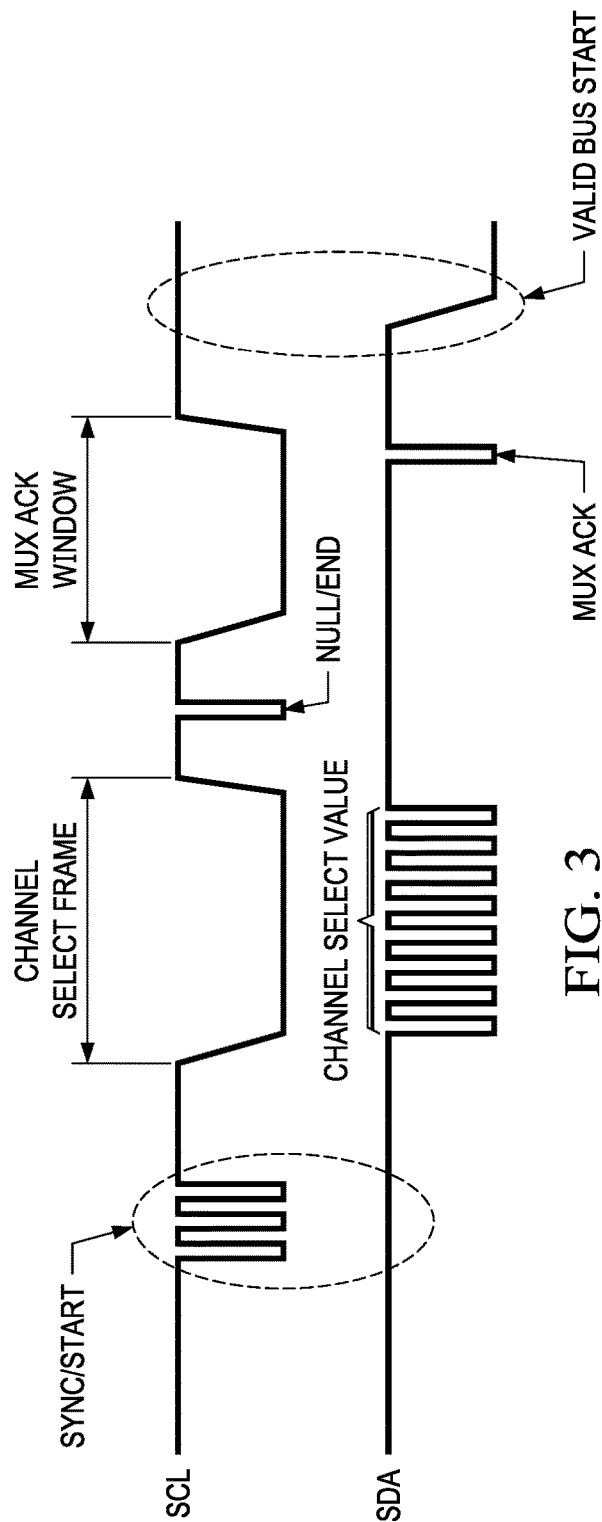
FIG. 3 illustrates waveforms for a clock line and a data line driven by an I2C initiator for addressing a single level of a multiplexer topology, in accordance with embodiments of the present disclosure.

To illustrate the in-band pulse-addressing scheme enabled by the systems and methods described herein, reference is made to FIG. 3 that depicts waveforms for a clock line (SCL) and a data line (SDA) driven by an I2C initiator (e.g., initiator 202) for addressing a single level of a multiplexer topology, in accordance with embodiments of the present disclosure. As shown in FIG. 3, the method may begin with initiator 202 issuing a synchronization/start (SYNC/START) pulse burst on clock line SCL (e.g., three symmetrical low-going pulses). Such SYNC/START pulse burst may align (or realign) a receiver of a multiplexer 204 to accept a channel select frame and may cause such multiplexer 204 to open its downstream switches. After issuing the SYNC/START pulse burst, initiator 202 may assert clock line SCL (e.g., drive clock line SCL to low) to frame a pulse on data line SDA for selecting a downstream channel for a multiplexer 204 receiving the pulse burst. For example, a selected channel for a multiplexer may be indicated by a number of pulse bursts generated on data line SDA during the channel select frame. Thus, the eight low-going pulses generated on data line SDA during the channel select frame depicted in FIG. 3 may indicate a selection of multiplexer channel 8.

After completion of pulse bursts on data line SDA indicating channel selection, initiator 202 may generate a NULL symbol to indicate no further levels are being selected. For example, as shown in FIG. 3, a NULL symbol may be defined by a initiator 202 asserting clock line SCL low for a brief pulse with no data line SDA pulses. After generating the NULL symbol, initiator 202 may assert clock line SCL low and wait (with a timeout) for an acknowledge response driven onto data line SDA from a multiplexer 204.

If the channel selection is valid, multiplexer 204 may respond with an acknowledge signal (e.g., a quick pulse of driving of data line SDA to low), after which initiator 202 may deassert clock line SCL and assert data line SDA (e.g., drive data line SDA to low) to indicate that the channel is ready to process normal bus traffic.

On the other hand, if the channel selection is invalid, multiplexer 204 may not respond with an acknowledge signal and the acknowledgment window generated by initiator 204 may time out, with the result that no channel will be selected.

Figure 4:
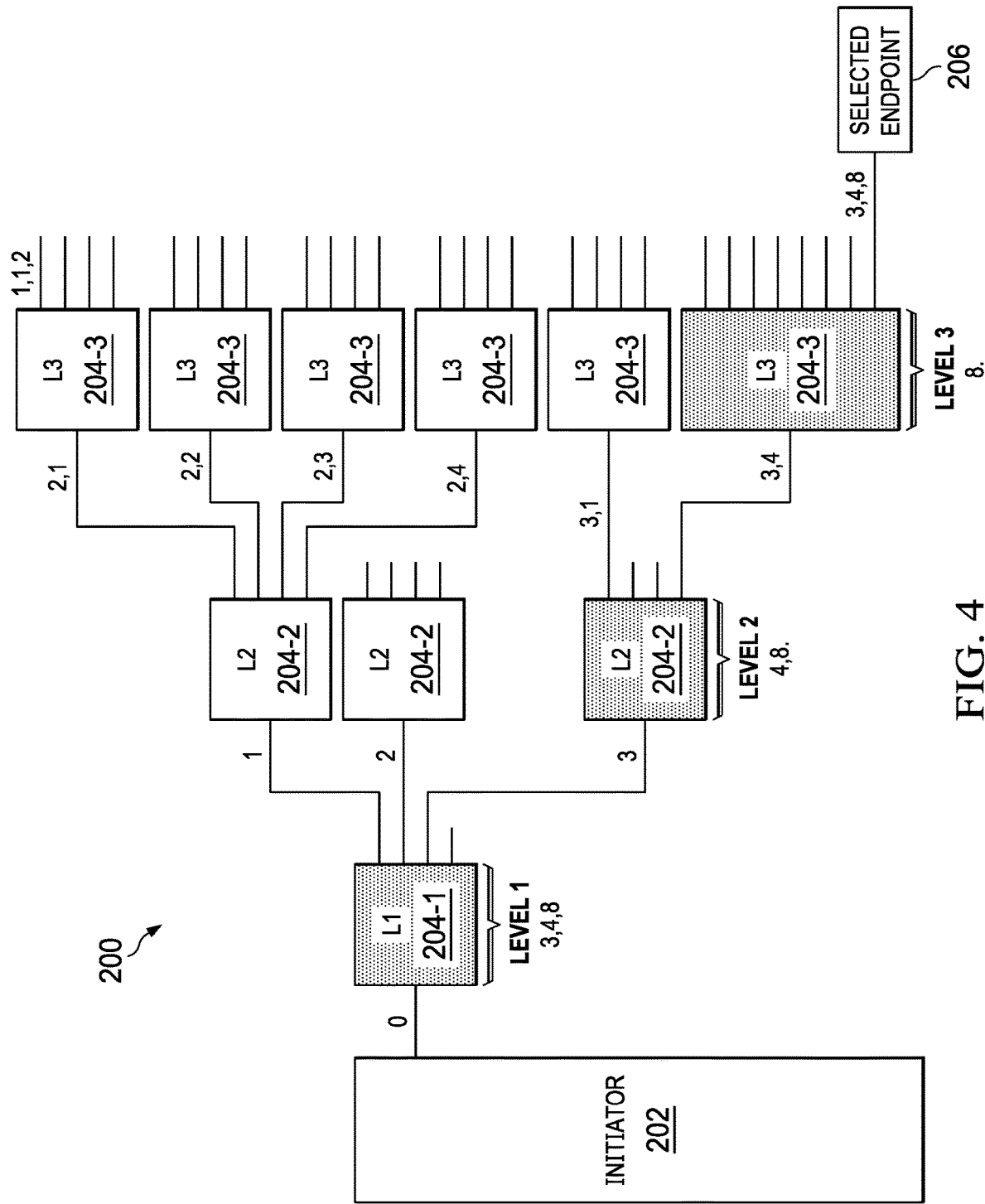
FIG. 4 illustrates a multiplexer topology with a particular selected endpoint addressed by an initiator using a multi-level in-band addressing scheme, in accordance with embodiments of the present disclosure.

In addition, initiator 202 may be configured to address multiple levels of a multiplexer topology. To illustrate, FIG. 4 depicts multiplexer topology 200 shown in FIG. 2 above, with a particular selected endpoint 206 addressed by initiator 202 using a multi-level in-band addressing scheme, in accordance with embodiments of the present disclosure. As shown in FIG. 4, and as described in greater detail below, in a multi-level topology, initiator 202 may generate and communicate multiple channel select values via its pulse-addressable scheme, and each level of multiplexer 204 may strip off the channel information for its own level, and then communicate the remaining channel select values downstream for the remaining levels, in a sense acting as an initiator for its downstream multiplexers 204 and endpoints 206.

To further illustrate, in a specific example, initiator 202 may generate and communicate channel select values 3, 4, 8 to first-level multiplexer 204-1. The first channel select value (3) may correspond to a downstream channel of first-level multiplexer 204-1, the second channel select value (4) may correspond to a downstream channel of a second-level multiplexer 204-2 downstream of the selected downstream channel of first-level multiplexer 204-1, the third channel select value (8) may correspond to a downstream channel of a third-level multiplexer 204-3 downstream of the selected downstream channel of second-level multiplexer 204-2, and so on.

Thus, as shown in FIG. 4, first-level multiplexer 204-1 may receive channel select values 3, 4, 8 from initiator 202, select its downstream channel 3 for further communication, and communicate channel select values 4, 8 on its downstream channel 3. In turn, second-level multiplexer 204-2 may receive channel select values 4, 8 from first-level multiplexer 204-1, select its downstream channel 4 for further communication, and communicate channel select value 8 on its downstream channel 4. Subsequently, third-level multiplexer 204-3 may receive channel select value 8 from second-level multiplexer 204-2, select its downstream channel 8 for further communication, and communicate an acknowledgment signal ACK back to initiator 202 via the multi-level channel selected. In response to acknowledgment signal ACK, initiator 202 may release clock line SCL and the selected channel may then process normal bus traffic.

Figure 5:
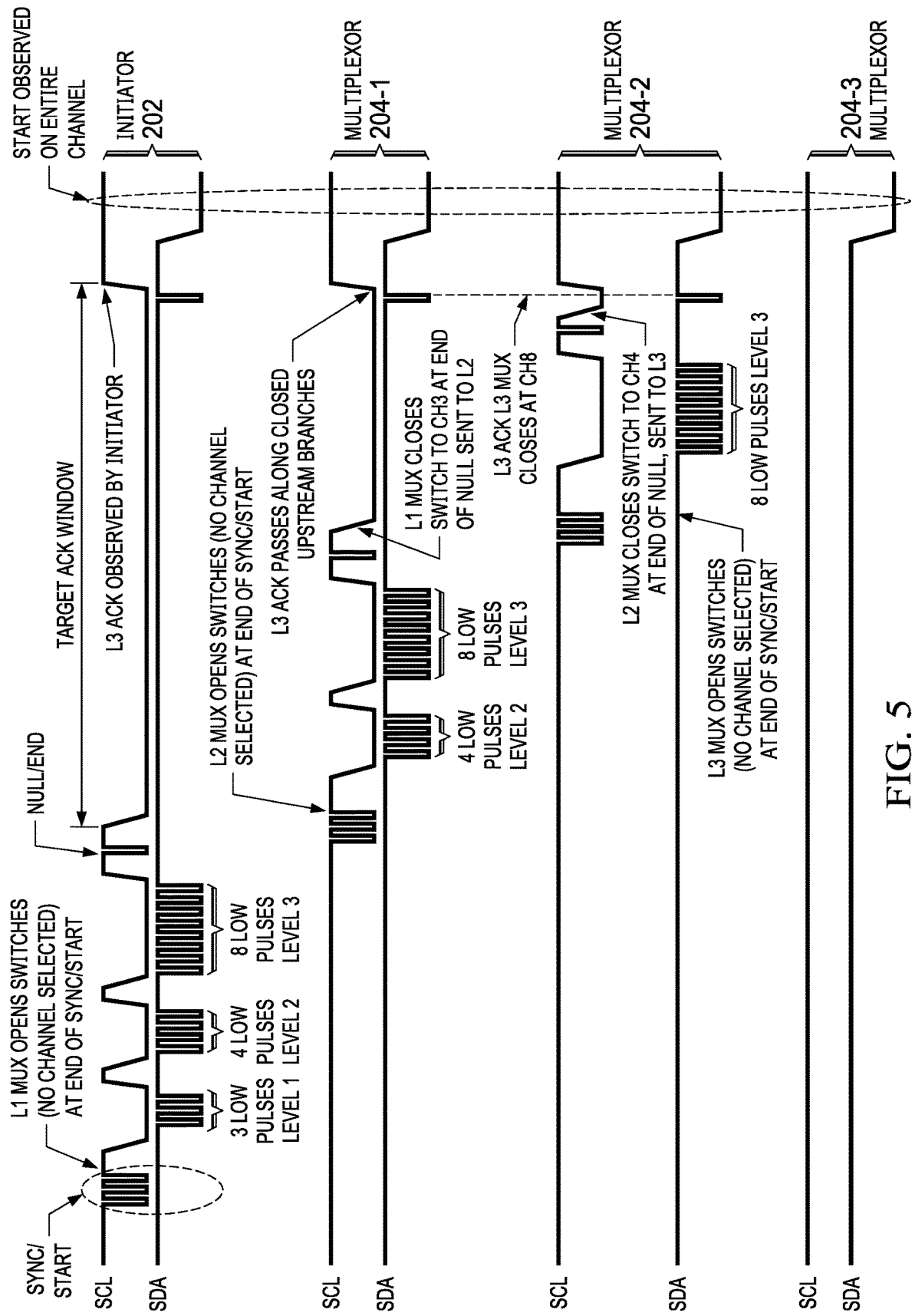
FIG. 5 depicts waveforms for clock lines and data lines driven by an I2C initiator and multiplexers for addressing multiple levels of a multiplexer topology, in accordance with embodiments of the present disclosure.

Such multi-level addressing scheme is further illustrated with respect to FIG. 5. FIG. 5 depicts waveforms for clock lines (SCL) and data lines (SDA) driven by I2C initiator 202 and multiplexers 204 for addressing multiple levels of a multiplexer topology, in accordance with embodiments of the present disclosure.

As shown in FIG. 5, initiator 202 may begin addressing by issuing a SYNC/START pulse burst on clock line SCL, which may open downstream switches of first-level multiplexer 204-1. Initiator 202 may then assert clock line SCL to frame a data line SDA pulse burst that selects a downstream channel (e.g., channel 3) of level 1, and then may deassert clock line SCL. Initiator 202 may then assert clock line SCL to frame a data line SDA pulse burst that selects a downstream channel (e.g., channel 4) of level 2, and then may deassert clock line SCL. Initiator 202 may then assert clock line SCL to frame a data line SDA pulse burst that selects a downstream channel (e.g., channel 8) of level 3, and then may deassert clock line SCL. Initiator 202 may terminate the final channel select frame with a NULL symbol indicating that no further levels are to be selected.

Upon receipt of the foregoing addressing data frame from initiator 202, first-level multiplexer 204-1 may begin addressing by issuing a SYNC/START pulse burst on clock line SCL of its selected downstream channel (e.g., channel 3), which may open downstream switches of the selected second-level multiplexer 204-2. First-level multiplexer 204-1 may then assert clock line SCL to frame a data line SDA pulse burst that selects the downstream channel (e.g., channel 4) of level 2, and then may deassert clock line SCL. First-level multiplexer 204-1 may then assert clock line SCL to frame a data line SDA pulse burst that selects the downstream channel (e.g., channel 8) of level 3, and then may deassert clock line SCL. First-level multiplexer 204-1 may terminate the final channel select frame with a NULL symbol indicating that no further levels are to be selected.

Upon receipt of the foregoing addressing data frame from first-level multiplexer 204-1, second-level multiplexer 204-2 may begin addressing by issuing a SYNC/START pulse burst on clock line SCL of its selected downstream channel (e.g., channel 4), which may open downstream switches of the selected third-level multiplexer 204-3. Second-level multiplexer 204-2 may then assert clock line SCL to frame a data line SDA pulse burst that selects the downstream channel (e.g., channel 8) of level 3, and then may deassert clock line SCL. Second-level multiplexer 204-2 may terminate the channel select frame with a NULL symbol indicating that no further levels are to be selected.

Upon receipt of the foregoing addressing data frame from second-level multiplexer 204-2, third-level multiplexer 204-3 may determine if the selected channel is valid. If the selected channel is valid, third-level multiplexer 204-3 may respond to initiator 202 with an acknowledgement signal ACK, to which initiator 202 may respond by deasserting clock line SCL, and the channel between initiator 202 and the selected channel of third-level multiplexer 204-3 may process normal bus traffic. If the selected channel is not valid, third-level multiplexer 204-3 may not respond with an acknowledgement signal ACK, and a target acknowledgment window of initiator 202 may time out.

Figure 6:
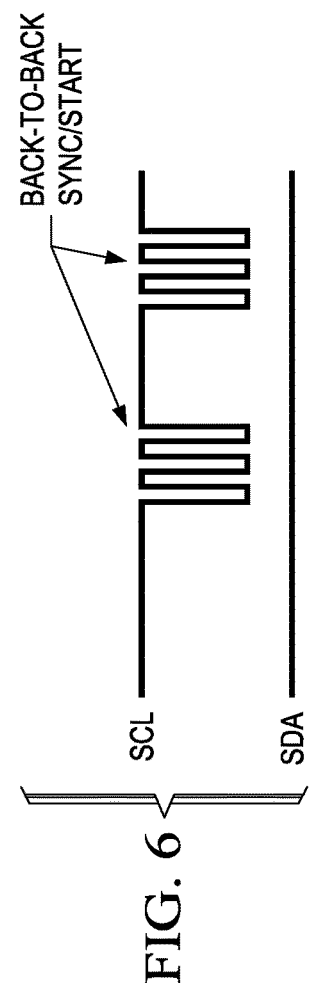
FIG. 6 illustrates waveforms for a clock line and a data line driven by an I2C initiator for resetting multiplexers of a multiplexer topology, in accordance with embodiments of the present disclosure.

FIG. 6 illustrates waveforms for clock line SCL and data line SDA driven by initiator 202 for resetting multiplexers 204 of multiplexer topology 200, in accordance with embodiments of the present disclosure. As shown in FIG. 6, initiator 202 may initiate a reset of multiplexers 202 by using back-to-back SYNC/START pulses or other suitable sets of pulses. Any multiplexer 204 receiving such reset command may reset itself (e.g., select no downstream channel) and replay the reset sequence to all of its downstream channels, thus propagating the reset command throughout multiplexer topology 200.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a bus initiator;
   a plurality of bus endpoints; and
   a bus communicatively coupled between the bus initiator and the plurality of bus endpoints, wherein the bus comprises a multiplexer topology of a plurality of multiplexers;
   wherein:
      the bus initiator is configured to perform in-band addressing to select a communications channel through the multiplexer topology via an addressing protocol that uses pulse bursts for initiation of the addressing, identification of the communications channel, and termination of the addressing; and
      pulses of the pulse bursts are sufficiently short in duration to pass through filters of the bus endpoints such that the pulse bursts are not processed by the endpoints.

2. The information handling system of claim 1, wherein the bus initiator is a management controller for performing out-of-band management of the information handling system.

3. The information handling system of claim 1, wherein the bus comprises an Inter-Integrated Circuit bus.

4. The information handling system of claim 1, wherein each of the bus endpoints comprise a peripheral device of the information handling system.

5. The information handling system of claim 1, wherein the multiplexer topology comprises a plurality of levels between the initiator and the plurality of endpoints.

6. The information handling system of claim 5, wherein the identification of the communications channel generated by the bus initiator comprises a series of multiple pulse bursts, each pulse burst of the series of multiple pulse bursts identifying a downstream channel for a respective level of the multiplexer topology.

7. The information handling system of claim 6, wherein at least one multiplexer of the plurality of multiplexers is configured to:
   receive the pulse bursts;
   extract from the pulse bursts a pulse burst for selecting a downstream channel of the at least one multiplexer; and communicate via the downstream channel the pulse bursts other than the pulse burst for selecting the downstream channel of the at least one multiplexer.

8. The information handling system of claim 7, wherein at least one multiplexer proximate to one of the plurality of endpoints is configured to:
- determine if the communications channel identified in the pulse bursts for identification of the communications channel is valid; and
- if the channel is valid, communicate an acknowledgment signal to the bus initiator indicating that the communications channel is valid.

9. A method comprising, in an information handling system comprising a bus initiator, a plurality of bus endpoints, and a bus communicatively coupled between the bus initiator and the plurality of bus endpoints, wherein the bus comprises a multiplexer topology of a plurality of multiplexers:
- performing, by the bus initiator, in-band addressing to select a communications channel through the multiplexer topology via an addressing protocol that uses pulse bursts for initiation of the addressing, identification of the communications channel, and termination of the addressing;
- wherein pulses of the pulse bursts are sufficiently short in duration to pass through filters of the bus endpoints such that the pulse bursts are not processed by the endpoints.

10. The method of claim 9, wherein the bus initiator is a management controller for performing out-of-band management of the information handling system.

11. The method of claim 9, wherein the bus comprises an Inter-Integrated Circuit bus.

12. The method of claim 9, wherein each of the bus endpoints comprise a peripheral device of the information handling system.

13. The method of claim 9, wherein the multiplexer topology comprises a plurality of levels between the initiator and the plurality of endpoints.

14. The method of claim 13, wherein the identification of the communications channel generated by the bus initiator comprises a series of multiple pulse bursts, each pulse burst of the series of multiple pulse bursts identifying a downstream channel for a respective level of the multiplexer topology.

15. The method of claim 14, further comprising, by at least one multiplexer of the plurality of multiplexers:
- receiving the pulse bursts;
- extracting from the pulse bursts a pulse burst for selecting a downstream channel of the at least one multiplexer; and
- communicating via the downstream channel the pulse bursts other than the pulse burst for selecting the downstream channel of the at least one multiplexer.

16. The method of claim 15, further comprising, by at least one multiplexer proximate to one of the plurality of endpoints:
- determining if the communications channel identified in the pulse bursts for identification of the communications channel is valid; and
- if the channel is valid, communicating an acknowledgment signal to the bus initiator indicating that the communications channel is valid.

* * * * *